United States Patent [19]
Parkinson

[11] 3,824,848
[45] July 23, 1974

[54] TWO SENSOR TORQUE MEASURING APPARATUS WITH COMPENSATION FOR SHAFT MISALIGNMENT

[76] Inventor: James R. Parkinson, R.D. No. 5, Vergennes, Vt. 05491

[22] Filed: June 27, 1972

[21] Appl. No.: 266,628

[52] U.S. Cl. ............................................. 73/136 A
[51] Int. Cl. ............................................. G01l 3/10
[58] Field of Search ................................... 73/136 A

[56] References Cited
UNITED STATES PATENTS
3,538,762  11/1970  Parkinson et al. ................ 73/136 A
3,589,178  6/1971  Germann ........................... 73/136 A

*Primary Examiner*—Charles A. Ruehl
*Attorney, Agent, or Firm*—Edwin E. Greigg

[57] ABSTRACT

A phase displacement torque measuring apparatus which compensates for any phase shift introduced in the output of a first sensing means by the misalignment of the shaft with respect to the first sensing means by utilizing a phase shifted signal from a second sensing means to compensate for the erroneous phase shift.

11 Claims, 6 Drawing Figures

3,824,848

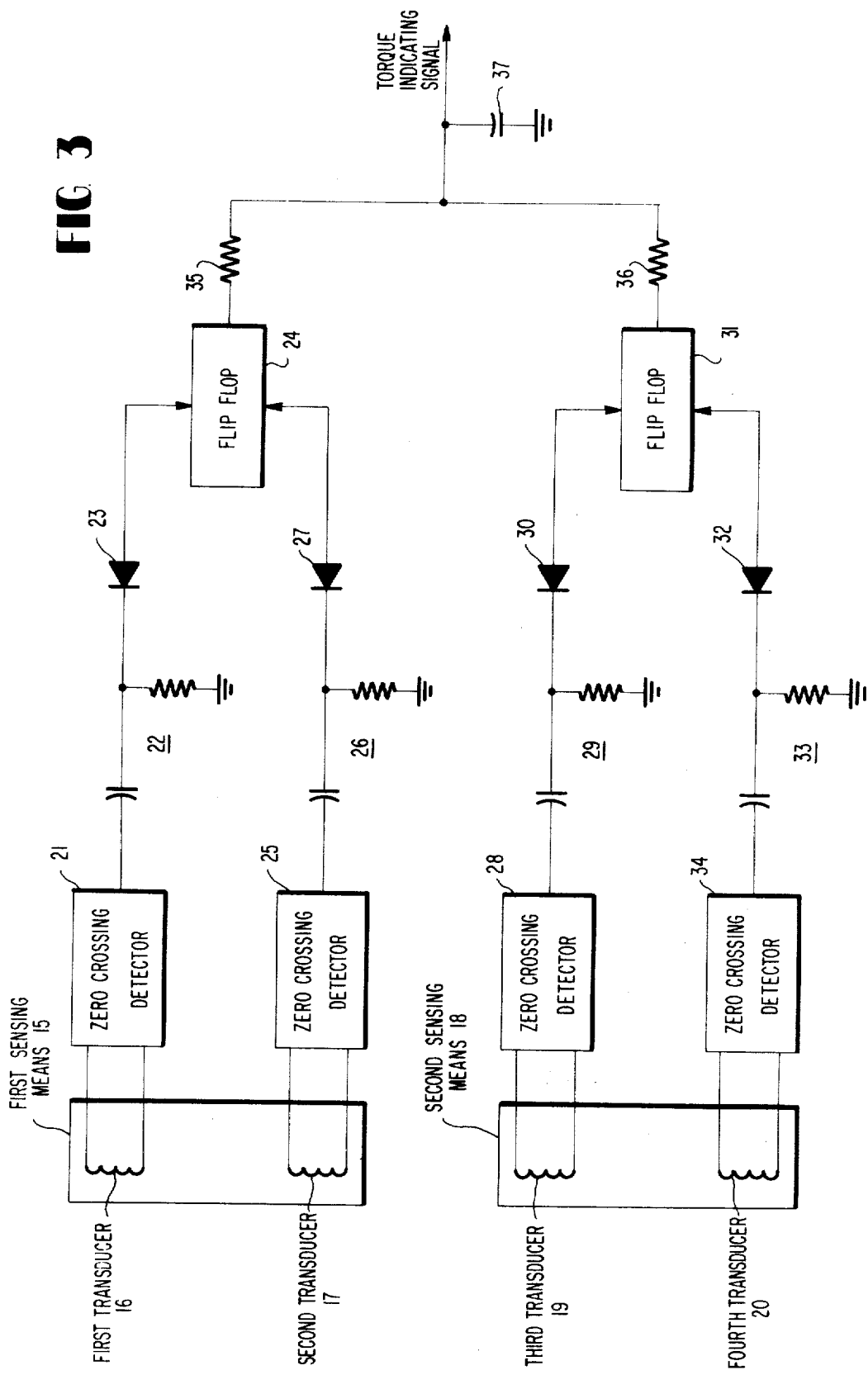

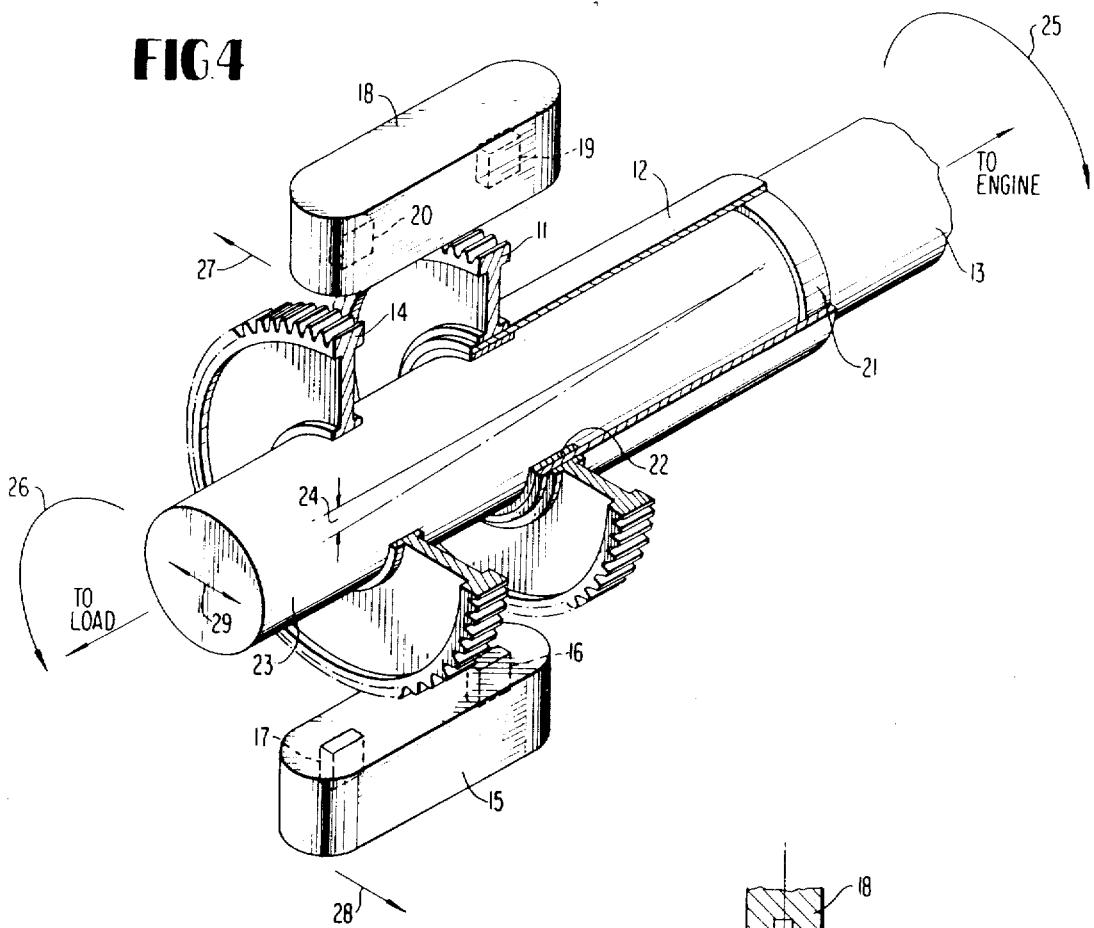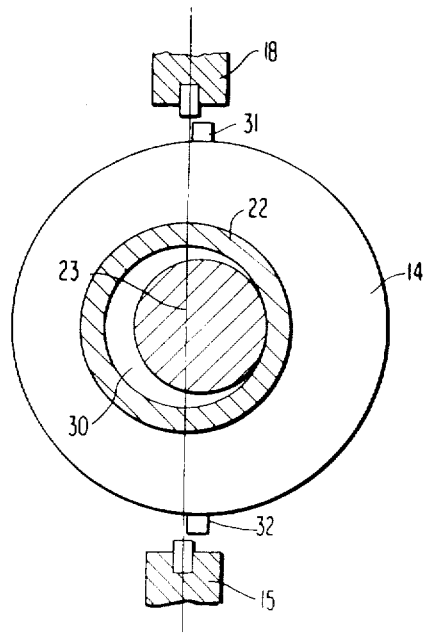

TWO SENSOR TORQUE MEASURING APPARATUS WITH COMPENSATION FOR SHAFT MISALIGNMENT

BACKGROUND OF THE INVENTION

This invention relates to a phase displacement torque measuring apparatus and more particularly to such an apparatus which compensates for the misalignment of the shaft with respect to a sensing means.

Generally, a phase displacement torque measuring apparatus measures the torque on a shaft by employing a reference toothed wheel and a torque-responsive toothed wheel fixed to the shaft and coupled to a sensing means. The coupling can be magnetic, electrical, optical, or any other by which the sensing means can generate a signal that is indicative of the relative position of the reference wheel with respect to the torque-responsive wheel.

A known torque-measuring apparatus uses a first toothed wheel that is fixed to a sleeve mounted on one end of the shaft as the reference wheel and a second toothed wheel that is fixed directly to the shaft as the torque-responsive wheel. The sensing means includes a first transducer and a second transducer magnetically coupled to the reference wheel and torque-responsive wheel, respectively. As the toothed wheels rotate, the teeth interact with the magnetic sensors to generate two separate sine waves whose relative phase difference is indicative of the relative position of the first toothed wheel with respect to the second toothed wheel. If both wheels are in line, the two sine waves are in phase, however, if one of the wheels should rotate more or less than the other, a phase shift is introduced between the two waves in a direction that is determined by the direction of the relative movement between the two wheels. Since the displacement of the second toothed wheel is in response to the torque applied to the shaft, the relative phase difference of the two sine waves which can be determined by appropriate circuitry is an accurate representation of the torque on the shaft.

One of the shortcomings of such an apparatus is that its accuracy can be lessened by misalignment between the shaft and the first and second transducer. Should this misalignment be evident, the teeth of one of the wheels will approach its respective transducer earlier than the other, and an erroneous phase shift will thus be introduced by the misalignment which will add or subtract from the phase shift introduced by the torque on the shaft, and an erroneous torque indication will be obtained.

In a static or non-torque condition or in rigid power plant structures, phase differences do occur due to misalignment of the shaft with respect to the center line passing through the two transducers. These are present due to machining tolerances in both angular alignments of the toothed wheels as well as the mounting of the transducers. This error can normally be eliminated by electrically bringing the system to zero in a non-torque state and is of little consequence under those conditions. However, in applying these torque-measuring devices to engines which power airplanes, helicopters, ships, and the like, the mounting structure during operation is far from rigid and flexes considerably, causing misalignments between the sensors and shaft, which are not compensated, and therefore introduce errors which may be far beyond the tolerance allowable.

One way of compensating for shaft sensor misalignment is shown in U.S. Pat. No. 3,538,762 to Parkinson, issued to the same assignee. In the Parkinson patent a third toothed wheel is fixed to the sleeve and is magnetically coupled to a third magnetic transducer. The sine wave generated by the third transducer has a phase shift relative to the sine wave generated by the reference wheel. The sine wave can be used to cancel the error introducing phase shift between the torque-responsive wheel and the reference wheel present due to the misalignment and thus obtain an accurate measurement. Although this apparatus provides satisfactory results in most instances, one of its disadvantages is that it requires the additional space on the shaft for the third toothed wheel and in some applications the additional space needed for a third wheel or gear on the shaft is not available.

A further disadvantage is that in instances requiring a high degree of accuracy in shafts which have low twist at high torque levels, the lack of or changes in concentricity between the sleeve on which the reference toothed wheel is mounted and the shaft itself in a direction perpendicular to the sensor will introduce another uncompensated phase error which will result in torque error. It can be shown that in some instances bearing clearances of as little as 0.002 inch introduce errors of as much as 10 percent in torque readout, this error not being compensated by the three wheel system cited above, thus better methods of compensation are required.

OBJECTS OF THE INVENTION

It is therefore an object of this invention to provide an improved torque-measuring apparatus which automatically compensates for the misalignment of the shaft with respect to a sensing means.

It is another object of this invention to provide an improved torque-measuring apparatus which automatically compensates for the misalignment of the shaft with respect to a sensing means that occupies a minimal amount of space on the shaft.

It is still a further object of this invention to provide an improved torque measuring apparatus which automatically compensates for play in the shaft bearings or in bearings which support the reference toothed wheel sleeve.

It is yet another object of this invention to provide an improved torque measuring apparatus utilizing a reference toothed wheel and a torque responsive toothed wheel with sensors mounted diametrically opposite to each other to sense the phase changes between them.

It is still another object of this invention to provide an improved torque measuring apparatus which automatically compensates for concentricity inaccuracies in the manufacture of the toothed wheels used for detecting torque.

SUMMARY OF THE INVENTION

Briefly stated, the above objects are obtained by employing a second sensing means spaced from a first sensing means where both sensing means are coupled to a reference means and a torque-responsive means which are fixed to the shaft. Appropriate circuitry derives a signal from the first sensing means having a component related to the relative position of the reference means with respect to the torque-responsive means and having a component related to the relative position of the shaft with respect to the first sensing means. The circuitry also derives a signal from the second sensing means which has a component related to the relative position of the reference means with respect to the torque-responsive means and a component related to the relative position of the shaft with respect to the second sensing means. The components of the signals derived from the first and second sensing means that relate to the relative position of the shaft with respect to the first and second sensing means are cancelled and an accurate torque-indicating signal is obtained.

A preferred embodiment uses a first toothed wheel on a sleeve that is fixed to the shaft as the reference means and a second toothed wheel that is fixed directly to the shaft as a torque-responsive means. The first sensing means includes first and second magnetic transducers which are magnetically coupled respectively to the first toothed wheel and the second toothed wheel. The second sensing means includes a third and fourth magnetic transducer magnetically coupled respectively to the first and second toothed wheels. The transducers are positioned adjacent the associated wheels such that as the first and second toothed wheels pass the respective transducers, each transducer generates a sine wave. The relative phase difference between the sine waves generated by the first and the second transducers is related to the relative position of the first toothed wheel with respect to the second toothed wheel, and the relative position of the shaft with respect to the first and the second transducers. Similarly, the relative phase difference between the sine waves generated by the third and the fourth transducers is related to the relative position of the first toothed wheel with respect to the second toothed wheel and to the relative position of the shaft with respect to the third and the fourth transducers. Circuitry coupled to the first and second sensing means cancels the phase shift related to the relative position of the shaft with respect to the first and the second transducers with the phase shift related to the relative position of the shaft with respect to the third and the fourth transducers to obtain an accurate torque indicating signal.

DESCRIPTION OF THE DRAWINGS

While the specification concludes with claims particularly pointing out and distinctly claiming the subject matter which is regarded as the invention, it is believed that the invention could be better understood from the following description taken in connection with the accompanying drawings in which:

FIG. 3 is a diagram of an appropriate circuit for deriving an accurate torque-indicating signal according to the invention;

FIG. 4 is a perspective view partly in section of the torque measuring apparatus; and FIG. 5 is a cross-sectional view on line 5—5 of FIG. 4.

DESCRIPTION OF THE PREFERRED EMBODIMENT

Figure 1:
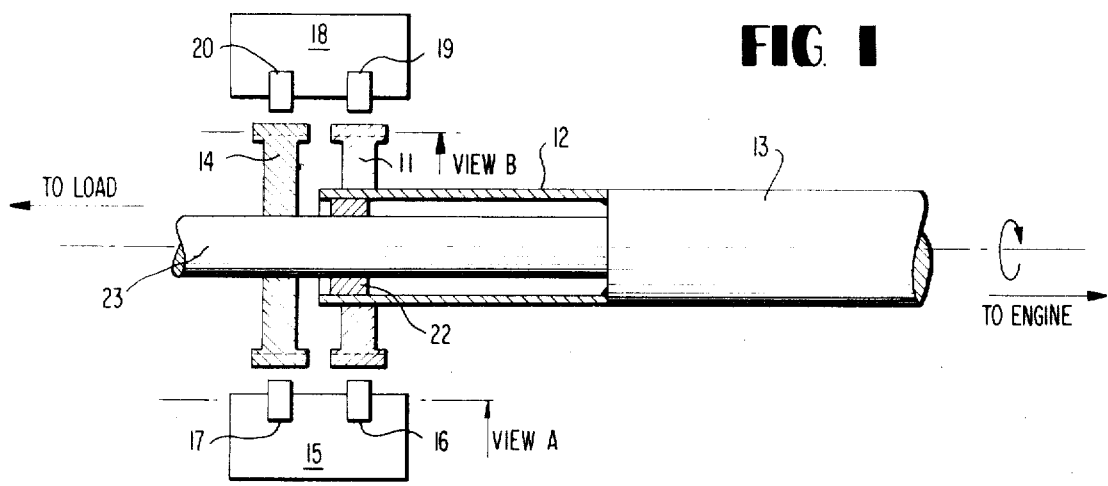
FIG. 1 shows the torque-measuring apparatus which is the preferred embodiment of this invention.

Referring to FIG. 1, a reference means, which includes a first toothed exciter wheel 11 mounted to the free end of sleeve 12, the other end of which is fixed to the shaft 13. A torque-responsive means includes a second toothed exciter wheel 14 fixed directly to the shaft 13, but spaced from the location of the first toothed wheel 11. To measure the torque on the shaft 13 by determining the relative position of the first toothed wheel 11 with respect to the second toothed wheel 14, a first sensing means 15 is provided which includes a first magnetic transducer 16 and a second magnetic transducer 17, each of which is mounted in close proximity to the exciter wheels 11 and 14, respectively. The first magnetic transducer 16 is magnetically coupled to the first toothed exciter wheel 11 and generates a first sine wave as the exciter wheel teeth pass the sensor pole of transducer 16. The second magnetic transducer 17 is magnetically coupled to the second toothed exciter wheel 14 and similarly generates a second sine wave as the exciter wheel teeth pass the sensor pole of the second transducer 17. To compensate for misalignment of the shaft 13, a second sensing means 18 is provided. The second sensing means includes a third magnetic transducer 19, magnetically coupled to the first toothed exciter wheel 11, and a fourth magnetic transducer 20 is magnetically coupled to the second toothed wheel 14. Magnetic transducers 19 and 20 are each mounted in close proximity to the exciter wheels. The third and fourth magnetic transducers 19 and 20 generate third and fourth sine waves as the exciter wheel teeth of the first toothed wheel 11 and the second toothed wheel 14 pass the sensor poles of transducers 19 and 20. The first and second sine waves can be considered as the first signals derived from the first toothed wheel and the second toothed wheel, while the third and fourth sine waves can be considered as the second signals derived from the first and second toothed wheels.

While in the preferred embodiment, magnetic coupling is employed, any suitable coupling, such as optical or electrical, can be used.

Figure 2A:
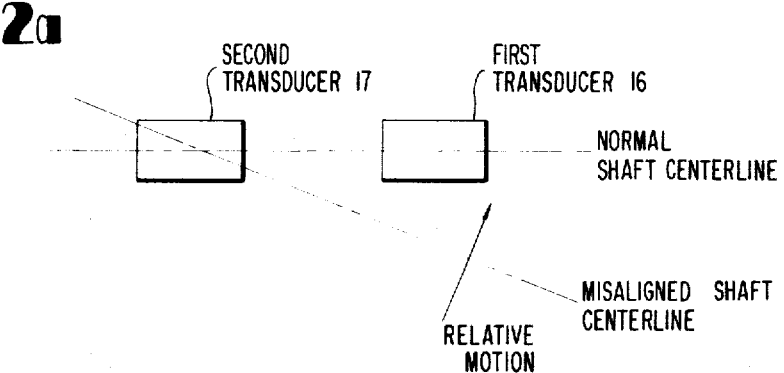
FIG. 2a is a diagram showing the misalignment of the shaft with respect to the first sensing means.
Figure 2B:
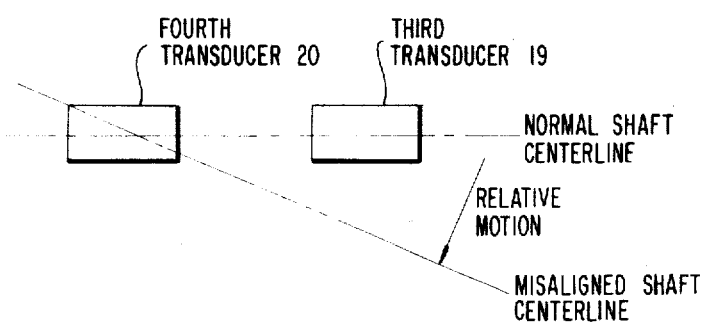
FIG. 2b is a diagram showing the misalignment of the shaft with respect to the second sensing means.

The manner in which the apparatus of FIG. 1 compensates for the misalignment of the shaft 13 with respect to the first sensing means 15 and the second sensing means 18 can be seen by referring to FIGS. 2a and 2b.

FIG. 2a, which is depicted as view A in FIG. 1 shows the first magnetic transducer 16 and the second magnetic transducer 17 of the first sensing means 15 and the normal and misaligned positions of the centerline of shaft 13, with respect to the transducers 16 and 17. FIG. 2b, which is depicted in FIG. 1 as view B shows the third magnetic transducer 19 and the fourth magnetic transducer 20, which are associated with the second sensing means 18 and the normal and misaligned positions of the centerline of the shaft 13 with respect to the magnetic transducers 19 and 20. Because of the misalignment of the shaft 13 with respect to the transducers 16 and 17 and the transducers 19 and 20, the shaft 13, and consequently the first toothed wheel 11 will be further from the first magnetic transducer 16 than the second toothed wheel 14 is from the second transducer 17. A similar situation exists with respect to the transducers 19 and 20. This difference will cause a tooth on the second toothed wheel 14 to pass the sensor pole of the second transducer 17 a short time before a corresponding tooth on the first toothed wheel 11 passes the sensor pole of the first transducer 16. The time difference causes a phase shift to be introduced between the first and second sine waves generated respectively by the first transducer 16 and the second transducer 17. This phase shift is related solely to the relative position of the shaft 13 with respect to the first sensing means 15 and the first and the second transducers 16 and 17. This phase shift will add or subtract from any phase shift introduced by the torque on the shaft 13 and consequently any signal derived from the first sensing means will have a component related to the torque, i.e., the relative position of the first toothed wheel 11 with respect to the second toothed wheel 14, and an erroneous component due to the relative position of the shaft 13 with respect to the first sensing means 15.

By virtue of the second sensing means 18 employed, the shaft misalignment will cause a second erroneous phase shift between the third and fourth sine waves that are generated by the third and fourth transducers 19 and 20. The relative moment of the first toothed wheel 11 and the second toothed wheel 14 with respect to the first sensing means 15 is opposite to that of the relative movement of the toothed wheels with respect to the second sensing means 18. Accordingly, the phase shift between the first and second sine waves will have a polarity opposite to the phase shift between the third and fourth sine waves. When the second sensing means 18 is located diametrically opposite the shaft 13 from the first sensing means 15, the phase shifts will be of equal magnitude. Advantageously, the erroneous phase shifts introduced by the misalignment of the shaft 13 can be cancelled by appropriate circuitry.

While the preferred embodiment shows the second sensing means 18 being positioned diametrically opposite the shaft 13 from the first sensing means 15, it should be understood that it can be coupled to the toothed wheels in any position, except 90 percent spaced from the first sensing means, in which case a compensation factor to take into account unequal magnitudes would then be provided. It will be apparent to those skilled in the art that the closer to being positioned at 180° apart, the more accurate the compensation will be.

It can be shown that the alignment between the upper transducer 18 and the lower transducer 15 is not critical nor must the initial angular alignment between the shaft and sensor 18 or the shaft and sensor 19 be the same since it is actually Δ misalignment that is summed and therefore cancelled.

FIG. 3 shows one of a number of circuits that can be used to derive an accurate torque-indicating signal. The circuitry is coupled to the first sensing means 15 and the second sensing means 18. More particularly, a zero crossing detector 21 has its input coupled to the first transducer 16 and its output coupled through an RC differentiator 22 and a diode 23 to one input of a flip-flop 24. A second zero crossing detector 25 is coupled to the second magnetic transducer 17 and through a second RC differentiator 26 and diode 27 to the other input of the flip-flop 24. The zero crossing detectors 21 and 25 supply to the differentiators 22 and 26 square waves at the incoming frequency which are differentiated and passed through diodes 23 and 27 to provide two trains of negative pulses to the inputs of flip-flop 24 that have a phase shift related to the phase shift between the first and second sine waves generated by the first transducer 16 and the second transducer 17.

A third zero crossing detector 28, differentiator 20 and diode 30 couple one input of a second flip-flop 31 to the third magnetic transducer 19. The other input of the flip-flop 31 is coupled through a diode 32, differentiator 33 and zero crossing detector 34 to the fourth transducer 20. The two trains of negative pulses have a phase shift related to the phase shift between the third and fourth sine waves generated by the third transducer 19 and the fourth transducer 20.

The signal at the output of the flip-flop 24 is a positive square wave that has a component related to the relative position of the first toothed wheel 11 with respect to the second toothed wheel 14 and a component related to the relative position of the shaft 13 with respect to the first sensing means 15 and the first and second transducers 16 and 17. Its average value is proportional to the torque on the shaft, plus or minus the Δ shaft position.

Similarly, the signal at the output of the flip-flop 31 has a component related to the relative position of the first toothed wheel 11 with respect to the second toothed wheel 14 and a component related to the relative position of the shaft 13 with respect to the second sensing means 18 and the third and fourth transducers 19 and 20.

The outputs of flip-flop 24 and flip-flop 31 are coupled through resistors 35 and 36 to an integrating capacitor 37 where the components related to the position of the shaft 13 with respect to the first sensing means 15 and the second sensing means 18 are cancelled. Since the torque information signal is additive, an accurate torque-indicating signal will be derived.

It should be noted that circuitry, using different elements or utilizing a different characteristic than phase shifts for relating the signals derived from transducers, can be employed.

Referring to FIG. 4, there is shown a perspective view of shaft 13 with the sleeve 12 affixed at one end to ring 21 and at its other end by sleeve bearing 22. Rigidly mounted on sleeve 12 is the toothed reference wheel 11 so that its angular position always corresponds to that of the shaft at ring 21, since no torque is transmitted through sleeve 12. Mounted and rigidly affixed to shaft extension 23 is the torque-responsive toothed wheel 14 which changes angle with respect to the toothed reference wheel 11 from twist in the shaft extension 23 as denoted by angle 24 when torque is applied. Affixed to the frame of the vehicle or device in which shaft 13 is mounted is transducer 18 above the shaft and transducer 15 below the shaft.

If the frame of the vehicle is twisted torsionally as denoted by arrows 25 and 26, transducers 18 and 15 will misalign equal amounts in opposite directions as denoted by arrows 27 and 28 and the change of phase angle noted will be zero. However, should shaft extension 23 bend in a direction as denoted by arrow 29, i.e., perpendicular to a plane passing through transducers 18, 15 and the shaft center line, then the Δ misalignment of the transducers will be in the same direction and the geometry and circuitry previously described will cancel the error. It will be obvious to those skilled in the art that the flexural changes in the shaft and body structure will be complex. However, the components of said flexural changes in the direction described are those for which compensation is required.

Bearing clearance or play is also compensated for by this unique torque-measuring system.

Referring to FIG. 5, there is shown shaft 23 misaligned to the right in its bearing 22 such that the bearing clearance 30 is exaggerated and shown on its left side. Mounted concentrically on shaft 23 is toothed torque-responsive wheel 14 and directly above and below said wheel is transducer 18 and 15, respectively, which are in alignment with the center line of bearing 22, since they are mounted to the frame as is bearing 22. It can be seen that diametrically opposite teeth 31 and 32 will induce a phase shift between the signals picked up by transducers 15 and 18 since one tooth has passed its respective transducer while the other is yet to pass its respective transducer, thus inducing the same effect as when the shaft is flexed as previously described. It will thus be apparent that the error induced will also be cancelled as previously described and thus compensation for bearing play and wear is automatically achieved.

While a specific embodiment of this invention has been shown and described, other embodiments may be made without departing from the spirit and scope thereof.

That which is claimed is:

1. An apparatus for measuring the torque on a shaft which provides compensation for shaft misalignment comprising, in combination:
   a. reference means fixed to said shaft;
   b. torque-responsive means fixed to said shaft and spaced from said reference means, said torque-responsive means being angularly displaceable relative to said reference means;
   c. first sensing means including first transducer means operatively coupled to said reference means and second transducer means operatively coupled to said torque-responsive means;
   d. second sensing means including third transducer means operatively coupled to said reference means and fourth transducer means operatively coupled to said torque-responsive means, said second sensing means being spaced from said first sensing means;
   e. first zero crossing detecting means coupled to said first transducer means and responsive to its output for developing a first signal;
   f. second zero crossing detecting means coupled to said second transducer means and responsive to its output for developing a second signal;
   g. first flip-flop means having two input means coupled respectively to said first zero crossing detecting means and to said second zero crossing detecting means, and responsive to the first and second signals;
   h. third zero crossing detecting means coupled to said third transducer means and responsive to its output for developing a third signal;
   i. fourth zero-crossing detecting means coupled to said fourth transducer means and responsive to its output for developing a fourth signal;
   j. second flip-flop means having two input means coupled respectively to said third zero crossing detecting means and to said fourth zero crossing detecting means, and responsive to the third and fourth signals; and
   k. integrating means coupled to said first flip-flop means and to said second flip-flop means and responsive to their outputs for developing a torque indicating signal.

2. An apparatus as set forth in claim 1, wherein said first and said second sensing means are positioned adjacent said reference means and said torque-responsive means and diametrically opposite each other.

3. An apparatus as set forth in claim 2, wherein said reference means is supported to a free end of a sleeve, the other end of said sleeve being fixed to said shaft, said sleeve being coaxially disposed with said shaft.

4. An apparatus as set forth in claim 1, wherein said reference means is a first wheel fixed to said shaft, and said torque responsive means is a second wheel fixed to said shaft.

5. An apparatus as set forth in claim 4, wherein said first and said second wheels are toothed and positioned adjacent said first and said second sensing means, said first and said second sensing means being disposed diametrically opposite each other.

6. An apparatus as set forth in claim 1, wherein said flip-flop means is coupled respectively to said first zero crossing detecting means and to said second zero crossing detecting means via respective differentiating circuit means.

7. An apparatus as set forth in claim 6, wherein respective diode means are respectively positioned between said respective differentiating circuit means and said first flip-flop means.

8. An apparatus as set forth in claim 6, wherein said second flip-flop means is coupled respectively to said third zero crossing detecting means and to said fourth zero crossing detecting means via further respective differentiating circuit means.

9. An apparatus as set forth in claim 8, wherein further respective diode means are respectively positioned between said respective further differentiating circuit means and said second flip-flop means.

10. Apparatus for measuring the torque on a shaft which compensates for shaft misalignment comprising, in combination:
   a. a sleeve fixed to said shaft;
   b. a first toothed wheel fixed to said sleeve;
   c. a second toothed wheel, spaced from said first toothed wheel and fixed to said shaft, said second wheel being responsive to the torque on said shaft;
   d. a first magnetic sensor having,
      i. a first transducer magnetically coupled to said first toothed wheel for generating a first sine wave in response to the passage of teeth of said first toothed wheel past said first transducer, and
      ii. a second transducer magnetically coupled to said second toothed wheel for generating a second sine wave in response to the passage of teeth of said second tooth wheel past said second transducer, whereby the relative phase difference between the first and second sine waves is related to the relative position of the first toothed wheel with respect to the second toothed wheel and of the relative position of the shaft with respect to the first and second transducers;
   e. a second magnetic sensor displaced from the first magnetic sensor having i. a third transducer magnetically coupled to said first toothed wheel for generating a third sine wave in response to the passage of teeth of said first toothed wheel past said third transducer, and
ii. a fourth transducer magnetically coupled to said second toothed wheel for generating a fourth sine wave in responsive to the passage of teeth of said second tooth wheel past said fourth transducer, whereby the relative phase difference between the third and fourth sine waves is related to the relative position of the first toothed wheel with respect to the second toothed wheel and of the relative position of the shaft with respect to the common axis of the third and fourth transducers f. first zero crossing detecting means coupled to said first transducer and responsive to its output for developing a first signal;

g. second zero crossing detecting means coupled to said second transducer and responsive to its output for developing a second signal;

h. first flip-flop means having two input means coupled respectively to said first zero crossing detecting means and to said second zero crossing detecting means, and responsive to the first and second signals;

i. third zero crossing detecting means coupled to said third transducer and responsive to its output for developing a third signal;

j. fourth zero crossing detecting means coupled to said fourth transducer and responsive to its output for developing a fourth signal;

k. second flip-flop means having two input means coupled respectively to said third zero crossing detecting means and to said fourth zero crossing detecting means, and responsive to the third and fourth signals; and l. integrating means coupled to said first flip-flop means and to said second flip-flop means and responsive to their outputs for developing a torque indicating signal.

11. An apparatus as set forth in claim 10, wherein said second magnetic sensor is disposed diametrically opposite from said first magnetic sensor.

* * * * *